UNITED STATES PATENT OFFICE.

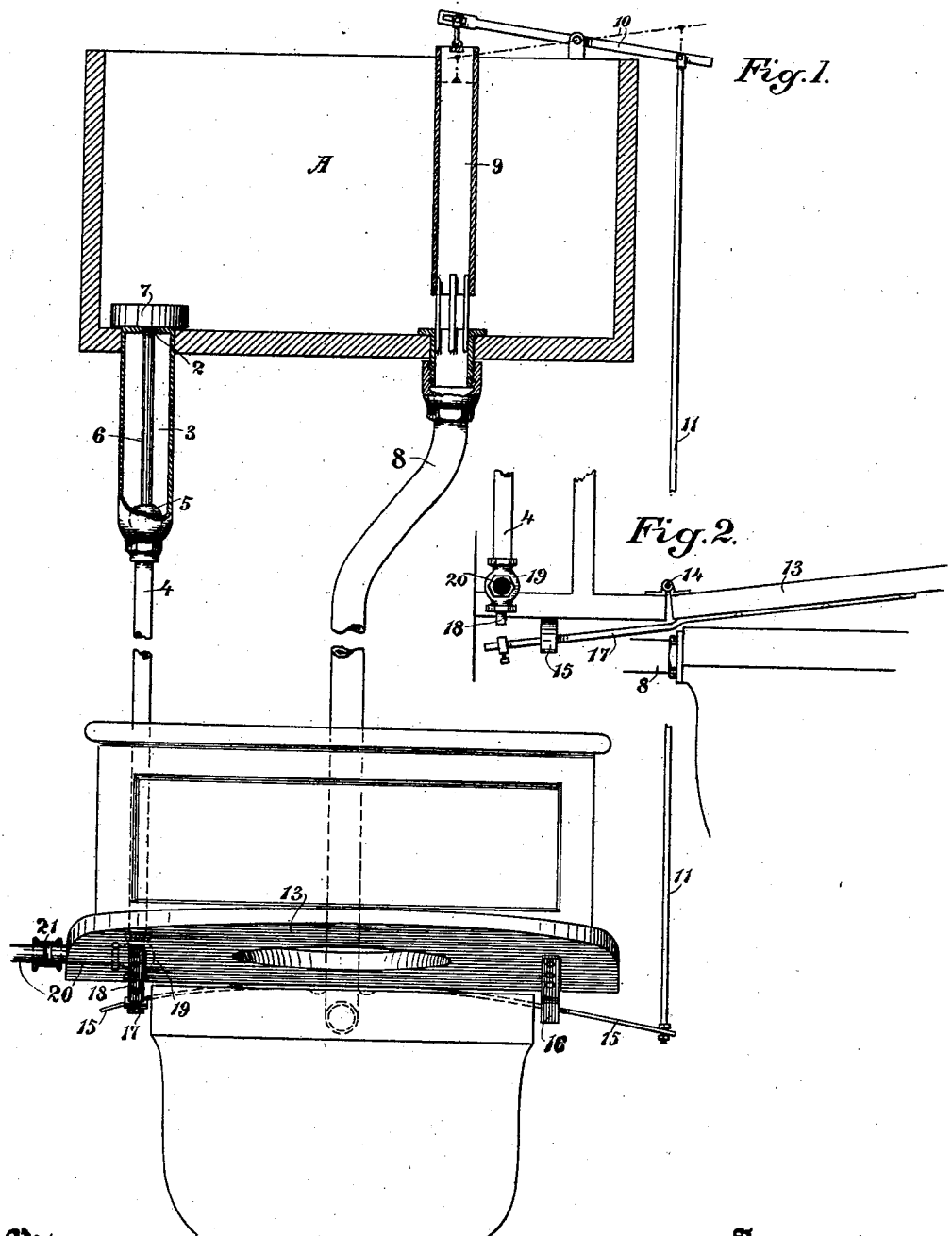

IRA P. CLARKE, OF ALAMEDA, CALIFORNIA.

FLUSHING-TANK.

SPECIFICATION forming part of Letters Patent No. 668,709, dated February 26, 1901.

Application filed January 29, 1900. Serial No. 3,153. (No model.)

*To all whom it may concern:*

Be it known that I, IRA P. CLARKE, a citizen of the United States, residing at Alameda, county of Alameda, State of California, have invented an Improvement in Flushing-Tanks; and I hereby declare the following to be a full, clear, and exact description of the same.

My invention relates to an apparatus for flushing closets and the like, where an intermittent or periodical discharge of a volume of water is desirable.

It consists of the parts and the construction and combination of parts hereinafter described and claimed.

Figure 1 is a front view of my apparatus. Fig. 2 is a side view showing the inlet-controlling device.

The object of my invention is to provide an automatic flushing device for closets and the like, in which the operation of filling the tank and of discharging its contents are effected without any of the gurgling, singing, or other noises caused by the flow of water through gradually opening or closing valves.

In the present drawings I have illustrated one form by which my invention may be carried out, in which A is the flushing-tank, adapted to contain as much water as may be needed for the purpose.

2 is the inlet-passage through which water is supplied to fill the tank. This is connected with a valve-chamber 3, which in the present case is shown extending beneath the bottom of the tank; but if the tank is so located that there is not space for this valve-chamber below the tank it may be contained within the tank, the operation being in either case essentially the same. 4 is the supply-pipe through which water is delivered into this valve-chamber. The chamber is of sufficient size to contain a valve 5, which may be a ball or other suitable and properly-operating valve. The stem 6 of this valve is connected with a float 7, so located as to be actuated by the rising of the water in the tank. The space around the valve 5 is sufficient to allow the water to flow freely into the tank when first started, and as the tank fills the float rises, gradually bringing the valve 5 nearer to its seat in the upper part of the valve-chamber until the valve has nearly reached the seat, when the rush of water passing the valve will act to suddenly close it against its seat, correspondingly lifting the float, which is light enough to allow this action to take place. By this construction the water is allowed to flow through the inlet-valve opening with little or no noise, and the singing or other noises caused by the gradual closing of ordinary valves when the tank is nearly filled is avoided because the valve is suddenly closed when it arrives within a short distance of its seat. The discharge from the tank takes place through a pipe 8, leading to the point where the water is to be used. The upper end of this pipe opens into the tank and is controlled by a valve 9, which is connected with one end of a fulcrumed lever 10, and this lever is connected by a rod 11 with an actuating mechanism for opening the valve, which mechanism will be described hereinafter. As here shown the valve 9 consists of a hollow cylinder open at the bottom and at the top and adapted to seat, when depressed, so as to prevent the escape of water from the tank into the discharge-pipe 8. Suitable guides maintain the alinement of this valve.

Various connections may be employed to operate these mechanisms. As here illustrated, I have shown the closet-seat 13 hinged, as at 14, and the front end is normally raised slightly by the action of a spring. The pressure of a spring is overcome when the seat is used. As here illustrated, I have shown a spring 15 fixed to some portion of the seat-frame. It is here shown as a flat spring having the central portion fixed and the ends bending downwardly and acting upon the ends of two lever-arms 16 and 17, which have their front ends fixed to the seat 13 and the rear ends projecting beneath the ends of the spring 15. The normal pressure of this spring acts to force the rear ends of the levers downwardly, and they thus cause the seat to turn about its hinges, so as to slightly rise in front. The lever-arm 17 extends back to a point where it is in line beneath a pressure-pin 18, which actuates a valve within the valve-chamber 19. This chamber is in the line of the water-supply pipe and the valve 18 is normally closed; but when the seat is occupied the closing pressure upon the seat acts through the lever 17 to open the valve 18, and thus allow a flow of water through the supply-pipe 4, which connects through the inlet-valve chamber 3 to the tank, as previously described. Whenever the seat is released, the supply-valve at 18 will immediately close; but, meanwhile, if the seat has been occupied sufficiently long the upper valve 5 will have closed, so that the supply in the tank will never exceed the desired amount, the two valves being independently actuated. The arm 16, acting upon the end of the spring 15 and upon the rod 11, which is connected with this spring, forces the rod upwardly, and, acting through the lever 10 upon the valve 9, the latter will be closed upon its seat, while the inlet-valve is opened. Thus the tank will be filled to the desired point, and during the occupancy of the seat, and when the latter is allowed to rise, the spring 15 being released acts to pull down upon the rod 11, thus tilting the lever 10 and raising the cylindrical valve 9, so that water within the tank may flow out through the discharge-pipe 8, as previously described. These movements are designed to fully open and close the valves in an instant, so that the full flow of the water is permitted until the time when it should be cut off, and the cut-off is as instantaneously effected, so that there will be no noise caused by this flow. To prevent such noises as are caused by the conducting power of metal pipes and the action of the water flowing through such pipes, I have shown the supply-pipe 20, which leads to the valve-chamber 19, as being separated and having a rubber or other elastic section 21 forming a connection between the two separated and contiguous ends of the pipe 20. This entirely cuts off any tendency to conduct the noise of flowing water and further assists in making the whole apparatus noiseless.

The valve-chamber 3 is larger than the inlet-pipe 4, and for this reason and because of the body of comparatively dead water which it contains it is very efficient in preventing noise. It also has the effect to prevent concussion and jar when the valve is closed, and this may be further assisted by connecting an air-chamber to the pipe.

Having thus described my invention, what I claim as new, and desire to secure by Letters Patent, is—

1. The combination with a flushing-tank, a hinged seat-plate having rearwardly-projecting arms and transversely-extending spring-plates engaged by said arms and by which said seat-plate is normally raised about its hinges, of a main inlet-valve, connections including one of the aforesaid arms by which said valve is opened when the seat is occupied, a pipe leading upwardly from the valve, a chamber of larger diameter intermediate between the pipe and the interior of the tank, a valve within the chamber having a stem and suspended by direct connection with a float within the tank, said valve having an annular space around it, through which water may flow into the tank, a seat at the upper end of the chamber against which the valve is suddenly and automatically closed by the pressure of the water when the valve has nearly reached the seat.

2. In a flushing-tank, the combination of means for filling the tank and automatically cutting off the water-supply, a discharge-pipe and controlling-valve and a lever connection with said valve, a hinged seat, a spring-plate extending transversely across back of the seat and having its ends free and normally bent downwardly, and arms fixed to and projecting rearwardly from the seat and adapted to engage the free ends of the springs to open the water-supply and simultaneously close said discharge-valve when the seat is occupied, said spring operating to raise the seat and cut off the water and open the discharge-valve when the seat is vacated.

In witness whereof I have hereunto set my hand.

IRA P. CLARKE.

Witnesses:
S. H. NOURSE,
GEO. H. STRONG.